United States Patent
Stein (10) Patent No.: US 9,163,391 B2
(45) Date of Patent: Oct. 20, 2015

(54) MODULAR CLICK-CONNECTOR ELEMENTS FOR ASSEMBLY OF WALL AND BUILDING SUPERSTRUCTURES

(71) Applicant: Alejandro Stein, Crans-Pres-Celigny (CH)

(72) Inventor: Alejandro Stein, Crans-Pres-Celigny (CH)

( * ) Notice: Subject to any disclaimer, the term of this patent is extended or adjusted under 35 U.S.C. 154(b) by 0 days.

(21) Appl. No.: 13/998,729

(22) Filed: Nov. 29, 2013

(65) Prior Publication Data

US 2015/0152633 A1    Jun. 4, 2015

(51) Int. Cl.
  *E04B 1/10*     (2006.01)
  *E04B 1/26*     (2006.01)
  *E04B 2/70*     (2006.01)

(52) U.S. Cl.
  CPC .............. *E04B 1/2608* (2013.01); *E04B 2/705* (2013.01)

(58) Field of Classification Search
  CPC ....... E04B 1/2608; E04B 2/705; E04B 2/701; E04B 2/708; E04B 1/18; E04B 1/24; E04B 2/58; E04B 2/702
  USPC .................. 52/233, 284, 587.1; 403/326, 382
  See application file for complete search history.

(56) References Cited

U.S. PATENT DOCUMENTS

| | | | |
|---|---|---|---|
| 2,982,586 A * | 5/1961 | Gliebe | 403/109.3 |
| 4,619,089 A | 10/1986 | Stein | |
| 5,282,343 A | 2/1994 | Stein | |
| 5,992,953 A * | 11/1999 | Rabinovitz | 312/111 |
| 6,213,672 B1 * | 4/2001 | Varga | 403/109.2 |
| 8,074,413 B2 | 12/2011 | Stein | |
| 8,099,917 B2 | 1/2012 | Stein | |
| 8,122,657 B2 | 2/2012 | Stein | |
| 8,215,082 B2 | 7/2012 | Stein | |
| 8,555,575 B2 | 10/2013 | Stein | |
| 8,567,139 B2 | 10/2013 | Stein | |
| 2003/0235463 A1 * | 12/2003 | Neumann et al. | 403/329 |

* cited by examiner

*Primary Examiner* — Brian D Mattei
(74) *Attorney, Agent, or Firm* — Donald S. Dowden (57) ABSTRACT

A modular connector element has a hook, a catch, and fittings for connection to an end of a hollow log for assembly into a wall or building superstructure. In assembling three such connector elements in a sequence conforming a corner between two structural walls, the hook of the middle connector element makes a click connection with a catch formed on a second such connector element positioned on one side of the middle connector element, and the catch of the middle connector element makes a click connection with a hook formed on a third such connector element positioned on the side of the middle connector element opposite the second connector element. The connector elements with their respective logs are thus rapidly, securely and manually click-locked together to erect walls and building superstructures.

18 Claims, 6 Drawing Sheets

MODULAR CLICK-CONNECTOR ELEMENTS FOR ASSEMBLY OF WALL AND BUILDING SUPERSTRUCTURES

BACKGROUND OF THE INVENTION

1. Field of the Invention

This invention relates to the assembly of wall and building superstructures and, more particularly, to a novel and highly effective method and apparatus for the modular assembly of wall and building superstructures comprising hollow "logs" formed of metal, plastic, or any other suitable material.

2. Description of the Prior Art

One of the simplest and fastest methods of constructing free-standing walls and building structures uses hollow "logs". They can be made of various materials, including but not limited to plastic and cardboard, but are usually made of metal and are therefore commonly referred to as "metalogs". Metalogs can be custom-made almost anywhere by a mobile tube forming machine, or "TFM", in which case the strip material to form the metalogs may be shipped in the form of coils, taking up little volume. The strip is can be longitudinally or spirally lock-formed into metalogs. The TFM-can be installed on a trailer or barge to reach construction sites. An internal-combustion engine typically powers the TFM, so the metalog fabrication can take place in locations with no infrastructure. This type of construction is ideally suited for employment in remote and rural areas, where requirements for fast-track construction of walls or fences, as well as of residential and non-residential buildings of a quality second to none for a same type of specifications, are often difficult to meet.

In this type of construction, connector elements fitted to the ends of the metalogs-interlock with each other at corners where two structural walls meet, thus stabilizing the walls. Although metalogs are foreseen to intersect most often on a right angle, there is no problem in varying the connector elements' shape so as to have metalogs intersect at different angles. Connector elements may also be used to connect metalogs forming a roof.

The present applicant is a leading developer of this type of construction, as exemplified by his prior U.S. Pat. Nos. 4,619,089, 5,282,343, 8,074,413, 8,099,917, 8,122,657, 8,215,082, 8,555,575, and 8,567,139, plus numerous patents in other countries. The identified US patents and applications are incorporated herein by reference.

Relatively small wall and building superstructures comprising metalogs can be assembled, start to finish, literally within minutes or hours using unskilled local labor. Larger wall and building structures can also be put together in particularly short times, when comparing with alternative methods of construction. Typically galvanized, aluminized or pre-painted metalogs and other structural components render them impervious to rust, rot, fire and termites, while the combination of continuity and light weight of their structural surfaces renders them less susceptible than masonry and other conventional methods of construction to damage by high winds and earthquakes. A membrane impermeable to water may optionally be applied to the roof to shed rain. Otherwise, the hollow logs can disappear from view underneath internal and/or external cladding with or without thermal insulation incorporated into it.

These considerations have made this type of construction broadly acceptable in various countries for the construction of low-rise buildings of up to three stories and especially as a means of providing, on fast-track mode irrespective of location, free-standing walls and residential and non-residential buildings.

In order to make such free-standing walls and residential and non-residential building structures simpler, faster and more affordable to build, there is a need for further improvements in design and methods of construction.

OBJECTS AND SUMMARY OF THE INVENTION

An object of the invention is to provide an improved connector element and method of employing it, whereby workers, including local men and women with no prior construction experience, can assemble a wall or building superstructure in considerably less time than before and with the assurance that each step in the process has been correctly executed.

In more detail, objects of the invention include providing a connector element that:
  automatically locks itself into place;
  automatically lets an unskilled installer know that it has been successfully and correctly installed;
  automatically positions a metalog to which it is attached in wall and roof assemblies
  resists on its own, with no complementary components, uplift efforts related to high wind or other phenomena
  reduces the complexity of construction, logistics and inventories; and
  is easy and inexpensive to manufacture and install.

The foregoing and other objects of the invention are attained by providing a modular connector element comprising a hook, means forming a catch, and means for connection to an end of an elongated structural member for assembly into a wall or building superstructure. The hook is complementary to a catch formed on a second (identical) connector element positioned on a first side of the modular connector element, and the catch is complementary to a hook formed on a third (identical) connector element positioned on a second side of the modular connector element opposite said first side. The modular connector element is adapted for first engagement with the second connector element and second engagement with the third connector element in such a manner that, in response to the first engagement, the catch of the second connector element catches the hook of the modular connector element and, in response to the second engagement, the catch of the modular connector element catches the hook of the third connector element. The modular connector element is thus locked between the second and third connector elements.

In accordance with the invention, all of the connector elements are modular: that is, the modules of any given design set are substantially identical to one another and therefore fully interchangeable in the same or a different wall or building superstructure that employs modules of that design set. Moreover, each module is preferably indivisible—a one-piece structure devoid of parts (i.e., not comprising parts) that, once joined, are separable).

BRIEF DESCRIPTION OF THE DRAWINGS

A better understanding of the objects, features and advantages of the invention can be gained from a consideration of the following detailed description of its preferred embodiments, together with the appended drawings (drawn to different scales), wherein.

DETAILED DESCRIPTION OF PREFERRED EMBODIMENTS OF THE INVENTION

Figure 1:
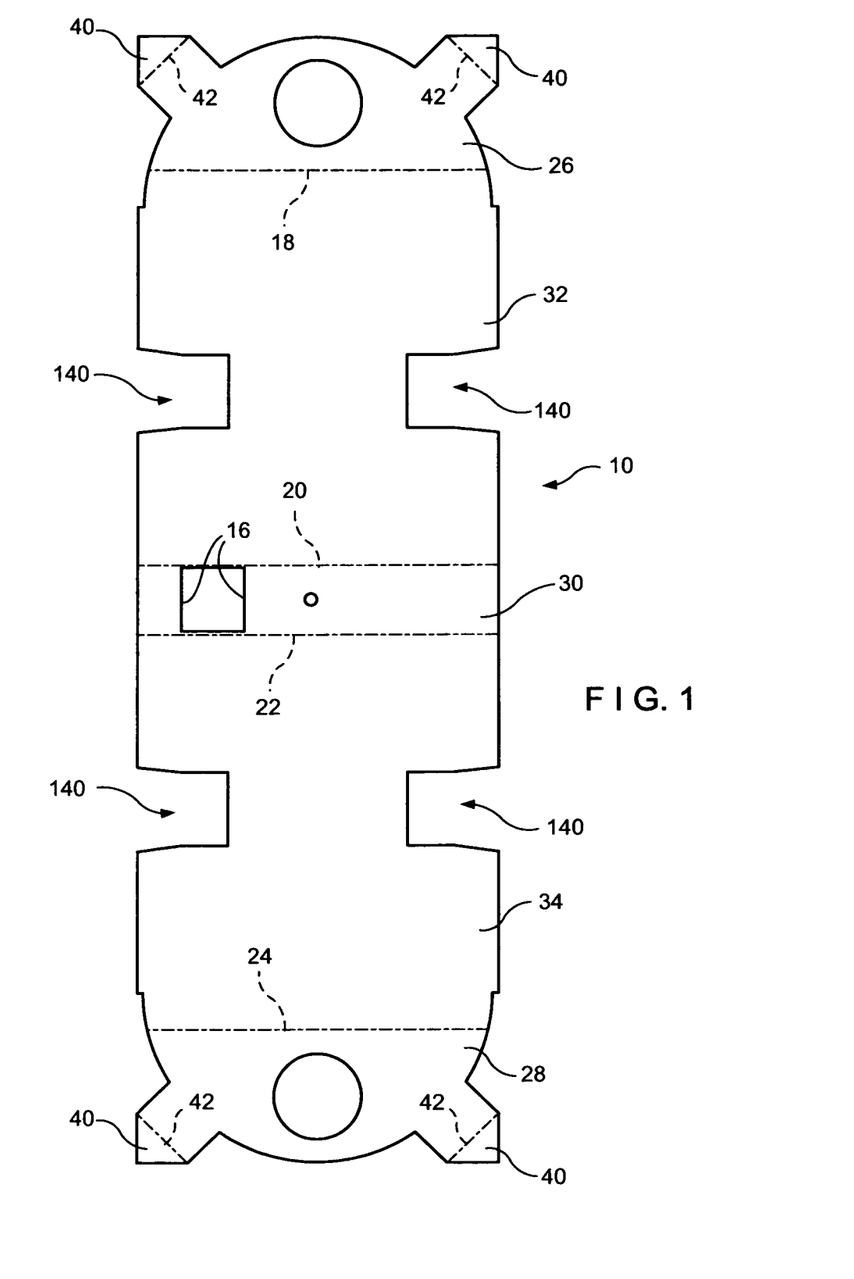
FIG. 1 is a top plan view of a flat blank for forming a first part of a connector element in accordance with the invention, which includes a catch as explained below.
Figure 2:
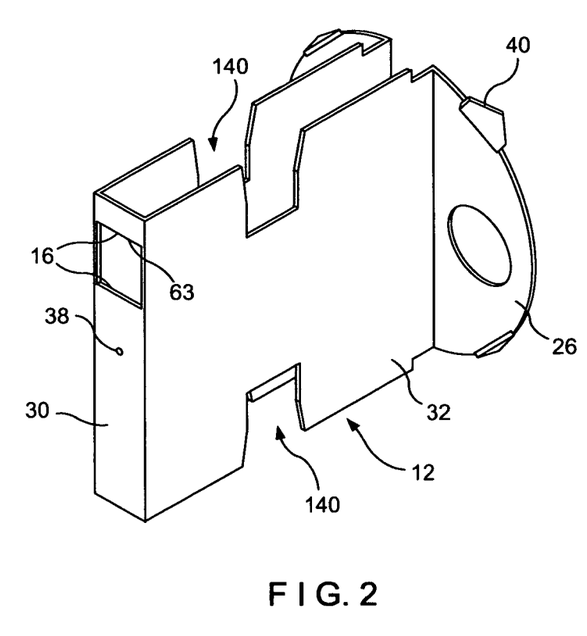
FIG. 2 is an isometric perspective view of the part formed from the blank of FIG. 1.
Figure 6:
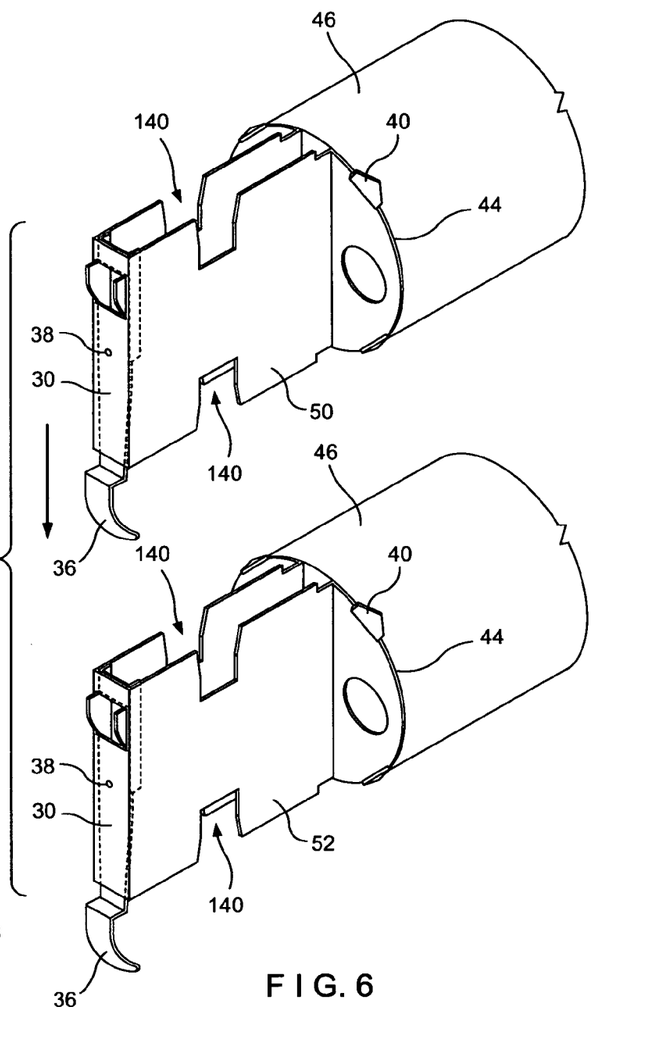
FIG. 6 is an isometric perspective view of two modular connector elements each having the hook of FIG. 5 and being attached to respective metalogs, the upper modular connector element with its attached metalog being lowered onto the lower modular connector element for making a click connection thereto.
Figure 7:
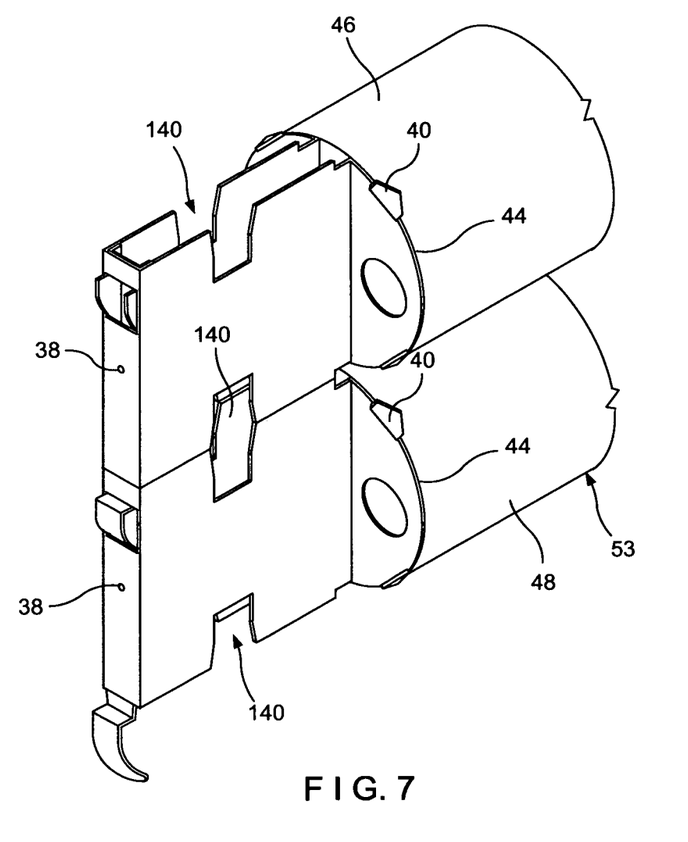
FIG. 7 is an isometric perspective view of the structure of FIG. 6 after the click connection is made.

FIG. 1 shows a flat blank 10 for forming a first embodiment of the part 12 (FIG. 2) of a modular connector element 50 or 52 (FIGS. 6 and 7). The part 12 includes a catch 16, which in a preferred embodiment is an opening into which the hook of an adjacent modular connector element pops automatically during assembly of a building superstructure as described below. The blank 10 of FIG. 1 has fold lines 18, 20, 22 and 24 and to form the part 12 is folded 90 degrees into or out of the plane of FIG. 2 about the fold lines 20 and 22 and outwardly about the fold lines 18 and 24 so that portions 26, 28 and 30 remain parallel to the plane of the figure and portions 32 and 34 are perpendicular to the plane of the figure. The folds can be made on site but are preferably made off site before the assembly of the superstructure is commenced. The folds can be made sequentially in any order or simultaneously, and the part 12 can be stamped in a factory.

Figure 3:
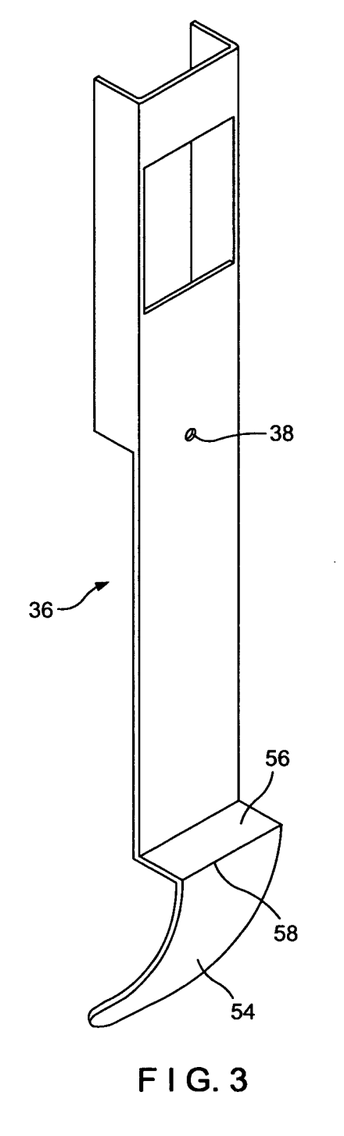
FIG. 3 is an isometric perspective view of a second part of a connector element in accordance with the invention, which includes a hook as explained below.
Figure 4:
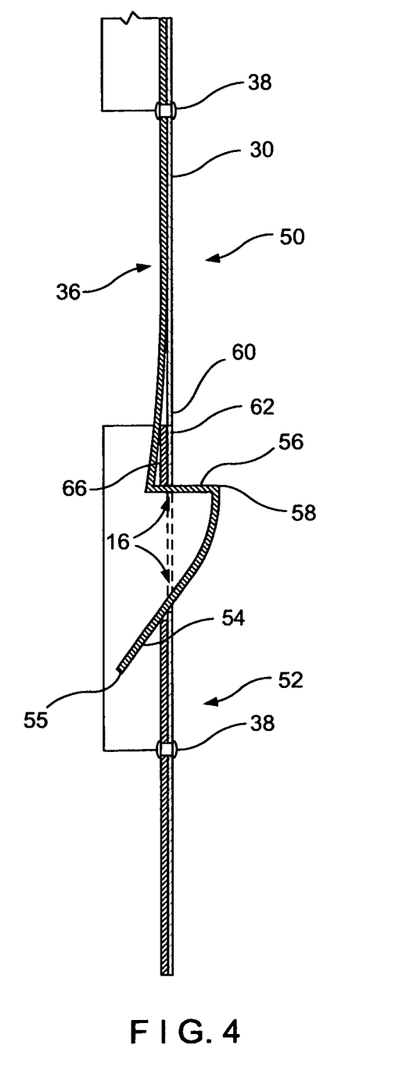
FIG. 4 is a sectional view in side elevation of the hook of one modular connector element according to the invention after making a click connection with the catch of another modular connector element according to the invention.
Figure 5:
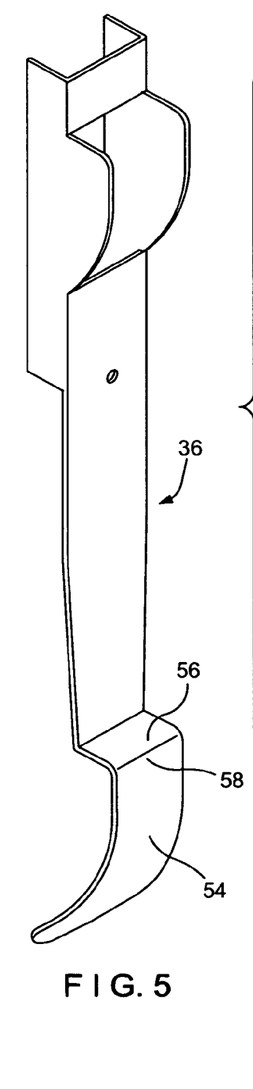
FIG. 5 is an isometric perspective view of a second embodiment of a hook according to the invention.

The modular connector element 14 also comprises a hook 36 one embodiment of which is shown in FIGS. 3 and 4 and another embodiment of which is shown in FIGS. 5 and 6. In any given connector element, a suitable connecting means such as a weld (not shown) or a pop rivet 38 at locations shown in the several figures connects the part with the hook 36 (shown in FIG. 5 for example) to the part 12 with the catch 16 (shown in FIG. 2 for example). As the following description makes clear, once the part with the hook and the part with the catch are joined in accordance with the invention, they can be disassembled only by intentional human intervention or by application of a force of nature of sufficient magnitude to distort or rupture the very steel or other material of which the modular connector elements are made.

The part 12 with the catch 16 comprises a plurality of means 40 (FIG. 1) folded about respective fold lines 42 for a crimp attachment to an end 44 (FIGS. 6 and 7) of an elongated structural member such as a metalog 46 or 48 for incorporation into a wall or a building superstructure.

As explained below in connection with FIG. 9, the modular connector elements for the metalogs in a first wall alternate with the modular connector elements for the metalogs in a second wall meeting the first wall at a corner. For clarity, however, FIG. 6 shows the metalogs 46 and 48 in a single wall about to be connected by modular connector elements 50 and 52. FIG. 7 shows the metalogs 46 and 48 after their connection through the modular connector elements 50 and 52.

Figure 8:
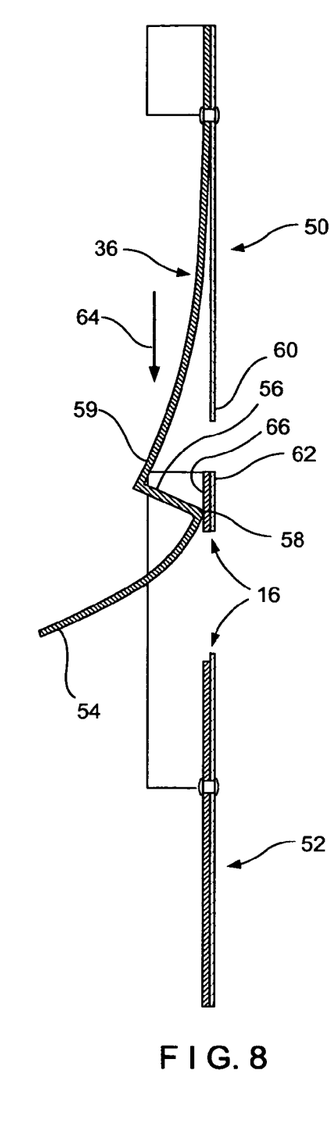
FIG. 8 is a sectional view in side elevation of the hook of an upper modular connector element making a sliding engagement with a lower modular connector element, before the hook of the upper modular connector element makes a click connection with the catch of the lower modular connector element.

FIG. 8 shows the hook 36 of an upper modular connector element 50 attached to an upper metalog 46 (FIG. 6) making a sliding engagement in a downward direction as indicated by an arrow 64 with the inner surface 66 of the wall of a lower modular connector element 52 attached to a lower metalog 48, before the hook 36 of the upper modular connector element 50 makes a click connection with the catch 16 of the lower modular connector element 52 (as noted above, FIG. 7 shows the metalogs 46 and 48 after the click connection is made). FIG. 4 shows how the hook 36 of one modular connector element is locked in the catch 16 of another modular connector element after the click connection is made.

The assembly of the metalogs 46 and 48 (FIGS. 6 and 7) proceeds as follows: The connector element 52 for the metalog 48 is connected to the connector element for the metalog next below it (not shown) or, in the case of the lowermost metalog in a wall such as the wall 53 (FIG. 7) of a building superstructure, by any suitable means to a foundation such as a concrete slab. After a connector element for a metalog in another wall meeting the wall 53 at an angle has been installed as explained below in connection with FIG. 9, a worker manually positions the log 46 above the log 48 and then lowers the upper modular connector element 50 onto the lower modular connector element 52 as indicated by the downwardly directed arrow in FIG. 6.

As FIG. 4 shows, the bottom 55 of a cam surface 54 of the hook of the upper modular connector element 50 extends to the left of the surface 66 of the lower modular connector element 52 when the upper modular connector element 50 is aligned vertically above the lower modular connector element 52. (FIG. 4 is for illustrative purposes; the orientation can be at any angle to the vertical.) The cam surface 54 is convex towards the surface 66 of the lower modular connector element 52 and, from the perspective of FIG. 4, extends from lower left to upper right. Accordingly, as the upper modular connector element 50 is thus lowered, the cam surface 54 located at the lower end of the hook 36 of the upper modular connector element 50 makes a sliding engagement with the top 62 of the surface 66 of the lower modular connector element 52.

The hook 36 is held higher up, closer to its top end, by the pop rivet 38 or other permanent attachment tightly against the portion 30 of the upper modular connector element 50 and is made of a flexible material such as steel, so the sliding engagement of the cam surface 54 with the top 62 of the surface 66 of the lower modular connector element 52 bends the bottom of the hook 36 to the left (from the perspective of FIG. 4 or 8) and stores energy in it. The hook 36 is bent more and more until the edge 58 engages the surface 66 and begins sliding down the surface 66.

The hook 36 is formed near its lower end, just above the cam surface 54, with a planar shelf 56. The shelf 56 meets the cam surface 54 at the edge 58 and forms substantially a right angle with the portion 59 (FIG. 8) of the hook 36 immediately above it and, when the hook 36 is seated in the catch 16, with the portion 30 of the lower modular connector element 52. (In the illustrated embodiment of the invention, the portion 30 comprises the structure forming the catch 16 of the modular connector elements.)

The length of the hook 36 between the pop rivet 38 or other permanent attachment and the shelf 56 is substantially equal to the length of the upper modular connector element 50 between the pop rivet 38 or other permanent attachment and the bottom 60 of the upper modular connector element 50 plus the length of the lower modular connector element 52 between the top 62 of the lower modular connector element 52 and the top 63 (FIG. 2) of the catch 16.

Therefore, just as the bottom 60 of the upper modular connector element 50 meets the top 62 of the lower modular connector element 52, as in FIG. 4, the shelf 56 of the upper modular connector element 50, propelled by the energy stored in the hook 36, snaps into the catch 16 of the lower modular connector element 52. As it does so, it emits an audible signal, namely a (typically) metal-on-metal clicking sound, that lets the worker know that the installation has been successful.

Since the plane of the shelf 56 extends at a right angle to the plane of the structure forming the catch 16, there is no cam action in response to an upward pull on the upper modular connector element 50. Accordingly, a vertically upward pull on the upper modular connector element 50, due for example to wind uplift, has no horizontal component tending to disengage the hook 36 from the catch 16. (Note that in a sloping roof, an "upward" pull forms an angle other than 90 degrees with respect to the horizontal. As indicated elsewhere, the invention is not limited to vertical walls.) And residual energy stored in the hook 36, which wants to be straight but is slightly bent as indicated in FIG. 4, ensures a constant force that maintains the shelf 56 securely seated within the catch 16.

It is therefore apparent that walls and superstructures assembled in accordance with the invention are quite robust and durable.

Figure 9:
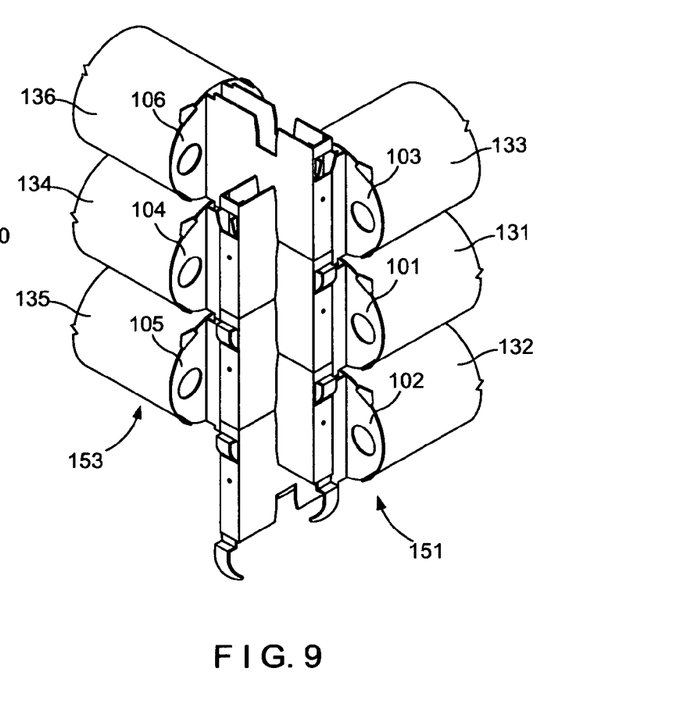
FIG. 9 is an isometric perspective view showing the assembly of a building superstructure where two walls meet at a corner.

For a better understanding of how the invention speeds the erection of a building superstructure, please refer to FIG. 9. It shows, in combination, a first modular connector element 101, a second modular connector element 102 positioned on a first side of (e.g., below) the first modular connector element 101, and a third modular connector element 103 positioned on a second side of (e.g., above) the first modular connector element 101, the second side being opposite the first side. The first, second and third modular connector elements 101, 102, 103 are substantially identical, and each comprises a hook and a catch as described above.

Means is provided as described above for respective attachment to respective adjacent ends of first, second and third hollow metal logs (metalogs) 131, 132, 133 for incorporation into a wall or roof of a building superstructure.

Each hook is complementary to each catch. The first modular connector element 101 is adapted for first sliding engagement with the second modular connector element 102 and second sliding engagement with the third modular connector element 103 in such a manner that, in response to the first sliding engagement, the catch of the modular connector element 102 catches the hook of the nodular connector element 101 and, in response to the second sliding engagement, the catch of the modular connector element 101 catches the hook of the modular connector element 103. In this manner, the first, second and third modular connector elements 101, 102, 103 are locked together.

The combination described above further comprises a fourth modular connector element 104, a fifth modular connector element 105 positioned on a first side of (e.g., below) the fourth modular connector element 104, and a sixth modular connector element 106 positioned on a second side of (e.g., above) the fourth modular connector element, the second side of the fourth modular connector element 104 being opposite the first side of the fourth modular connector element 104. The fourth, fifth and sixth modular connector elements 104, 105, 106 are substantially identical to each other and to the first, second and third modular connector elements 101, 102, 103.

The fourth, fifth and sixth modular connector elements 104, 105, 106 respectively comprise identical hooks and catches as described above, and means is provided for respective attachment to respective adjacent ends of fourth, fifth and sixth hollow metal logs (metalogs) 134, 135, 136 for incorporation into a wall or a building superstructure. All of the hooks are complementary to all of the catches.

The fourth modular connector element 104 is adapted for first sliding engagement with the fifth modular connector element 105 and second sliding engagement with the sixth modulator connector element 106 in such a manner that, in response to the first sliding engagement of the fourth modular connector element 104 with the fifth modular connector element 105, the catch of the fifth modular connector element 105 catches the hook of the fourth modular connector element 104 and, in response to the second sliding engagement of the fourth modular connector element 104 with the sixth modular connector element 106, the catch of the fourth modular connector element catches the hook of the sixth modular connector element 106. In this manner, the fourth, fifth and sixth modular connector elements 104, 105, 106 are locked together.

The fourth, fifth and sixth modular connector elements 104, 105, 106 are oriented relative to the first, second and third modular connector elements 101, 102, 103 in such a way that the fourth, fifth and sixth logs 134, 135, 136 extend at an angle (usually but not necessarily a right angle) to the first, second and third logs 131, 132, 133, and the modular connector elements are formed with the substantially identical cutouts 140 (FIGS. 1, 2, 6 and 7) whereby the fifth modular connector element 105 is locked between the first and second modular connector elements 101, 102, the first modular connector element 101 is locked between the fourth and fifth modular connector elements 104, 105, the fourth modular connector element 104 is locked between the first and third modular connector elements 101, 103 and the third modular connector 103 is locked between the fourth and sixth modular connector elements 104, 106.

Thus, four walls, for example, of a building superstructure can be erected as fast as a worker or team of workers can pick up a metalog, position it above a lower metalog in a wall, press it down until a click is heard at each end, go through the same process for the other walls at that level, and repeat the cycle until the walls have the designed height. Provision is easily made for doors, windows etc., as those skilled in the art will understand.

The invention includes a construction method as well as construction apparatus. The method comprises the steps of connecting each end of a plurality of hollow metal logs (metalogs) to a modular click connector element and stacking the logs to form at least two walls 151, 152 extending at an angle to each other and meeting at a corner 153 formed by the modular click connector elements. The modular connector elements for the logs 131, 132, 133 of one wall 151 alternate with the modular connector elements for the logs 134, 135, 136 of the other wall 152. The modular click connector elements are formed with cutouts 140, as mentioned above.

The method of the invention comprises click-connecting a modular connector element connected to a log of one wall to a modular connector element connected to the next lower log of the same wall while engaging the cutouts 140 to trap between the two logs a modular connector element connected to a log of the other wall. There are multiple ways of installing a log. For example, a log with a connector element at each end can be installed by a worker at each end, both ends of the log being popped into place at the same time or nearly the same time. For another example, one worker can install a log without help, especially if the log is relatively short.

The connector elements in a first wall are locked together, and the connector elements in a second wall meeting the first wall at a corner are likewise locked together. Moreover, the connector elements in the two walls alternate so that the connector elements in each wall are locked between the connector elements of the other wall.

The invention offers all the required elements for quick and easy construction of walls, silos and building superstructures: (i) speed; (ii) flexibility; (iii) competitive costs; (iv) the use of unskilled labor; (v) optional use of steel strip for the on-site fabrication of the system's basic structural components; (vi) the possibility of using locally available materials for wall cladding and roofing; (vii) the possibility as well, for simple one-level structures, to build directly on the ground (with no existing cement slab); (viii) a quality of construction, for permanent and temporary structures alike, which is second to none for same type of specifications (a solution for a five-star hotel, and for the most basic of shelters).

Thus there is provided in accordance with the invention a novel and highly effective method and apparatus for the assembly of building superstructures and, more particularly, for the modular assembly of building superstructures comprising hollow metal logs. The invention has features that make it especially desirable in situations where (i) speed of construction is important; (ii) the quality of construction is to be the same irrespective of location; and (iii) construction costs must be kept to a minimum. In accordance with the invention, a device of a single design can be used as the sole means of connecting the bones of any wall or any roof in any building superstructure in any project or construction program in any country or location.

Many modifications of the preferred embodiments of the invention disclosed herein will readily occur to those skilled in the art upon consideration of this disclosure. For example, while metalogs are at present the preferred "logs," similar structures made of plastic and other materials can instead be employed, as indicated above. And while all modular connector elements of a given design set are made to the same specifications, different design sets are within the scope of the invention. For example, a first design set made of thinner gauge material may be provided for a housing subdivision consisting of very small (even one-room) superstructures, and a second design set made of a heavier gauge material may be provided for a commercial development consisting of larger offices and stores. The sizes of the catch 16 and cutouts 140, the tension in the hook 36, etc., can all be varied, as those skilled in the art will appreciate. The invention extends to all structures and methods that fall within the scope of the appended claims.

The invention claimed is:

1. A set of first, second, and third modular connector elements for use in assembling a wall or a building superstructure, each modular connector element comprising:
   a hook;
   means forming a catch; and
   means for respective connection to an end of a first, second, and third elongated hollow metal structural member for forming said wall or building superstructure;
   wherein each hook is complementary to each catch so that the first modular connector element is adapted for first engagement with the second modular connector element on one side of the first modular connector element and second engagement with the third modular connector element on an opposite side of the first modular connector element in such a manner that, in response to the first engagement, the catch of the second modular connector element catches the hook of the first modular connector element and, in response to the second engagement, the catch of the first modular connector element catches the hook of the third modular connector element;
   whereby the first modular connector element is locked between the second and third modular connector elements and said modular connector elements lock said first, second, and third hollow metal structural members together.

2. A set of modular connector elements according to claim 1 in which each modular connector element is indivisible.

3. A set of modular connector elements according to claim 1 wherein the connection means makes a crimp connection to the respective hollow metal elongated structural members.

4. A set of modular connector elements according to claim 1 wherein the first engagement includes a sliding movement.

5. A set of modular connector elements according to claim 1 wherein the hook of the first modular connector element is permanently connected to the catch of the second modular connector element and comprises a flexible portion.

6. A set of modular connector elements according to claim 5 wherein the flexible portion bends in response to said first engagement and stores energy.

7. A set of modular connector elements according to claim 6 wherein the catch of the first modular connector element is formed as an opening for receiving the hook of the third modular connector element.

8. A set of modular connector elements according to claim 7 wherein the stored energy propels the hook of the first modular connector element into the catch of the second modular connector element.

9. A set of modular connector elements according to claim 8 wherein, when the hook of the first modular connector element is propelled into the catch of the second modular connector element, It emits an audible signal letting a worker know that the first modular connector element has been correctly installed.

10. A set of modular connector elements according to claim 8 wherein, for maintaining the hook of the first modular connector element within the catch of the second modular connector element, the hook of the first modular connector element has residual stored energy when caught in the catch of the second modular connector element.

11. A set of modular connector elements according to claim 10 wherein the hook comprises a cam for bending the hook in response to said first engagement.

12. A set of modular connector elements according to claim 11 wherein the hook of the first modular connector element includes a shelf oriented so that an upwardly directed force acting upon the first modular connector element when the hook of the first modular connector element is seated within the catch of the second modular connector element has substantially no component acting at 90 degrees with respect to said force tending to dislodge the hook of the first modular connector element from the catch of the second modular connector element.

13. A set of modular connector elements according to claim 12 wherein the shelf is planar and oriented perpendicular to structure forming the catch of the second modular connector element.

14. In combination, a first modular connector element, a second modular connector element positioned on a first side of the first modular connector element, and a third modular connector element positioned on a second side of the first modular connector element opposite said first side for use in assembling a wall or a building superstructure, the first, second and third modular connector elements respectively comprising:

substantially identical hooks;
substantially identical catches; and
means for respective attachment of said first, second, and third modular connector elements to respective adjacent ends of first, second and third hollow metal logs for incorporation into a wall or roof of a building superstructure;
wherein each hook is complementary to each catch;
the first modular connector element being adapted for first sliding engagement with the second modular connector element and second sliding engagement with the third modulator connector element in such a manner that, in response to the first sliding engagement, the catch of the second modular connector element catches the hook of the first modular connector element and, in response to the second sliding engagement, the catch of the first modular connector element catches the hook of the third modular connector element;
whereby the first, second and third modular connector elements are locked together and said first, second, and third modular connector elements lock said first, second, and third hollow metal logs together.

15. The combination of claim 14 wherein each modular connector element is indivisible.

16. The combination of claim 14 further comprising:
a fourth modular connector element, a fifth modular connector element positioned on a first side of the fourth modular connector element, and a sixth modular connector element positioned on a second side of the fourth modular connector element opposite said first side of said fourth modular connector element, the fourth, fifth and sixth modular connector elements being substantially identical to each other and to said first, second and third modular connector elements,
means for respective attachment of said third, fourth, and fifth modular connector elements to respective adjacent ends of third, fourth, and fifth hollow metal logs for incorporation into a wall or roof of a building superstructure,
the fourth modular connector element being adapted for first sliding engagement with the fifth modular connector element and second sliding engagement with the sixth modulator connector element in such a manner that, in response to the first sliding engagement of the fourth modular connector element with the fifth modular connector element, the catch of the fifth modular connector element catches the hook of the fourth modular connector element and, in response to the second sliding engagement of the fourth modular connector element with the sixth modular connector element, the catch of the fourth modular connector element catches the hook of the sixth modular connector element;
whereby the fourth, fifth and sixth modular connector elements are locked together;
the fourth, fifth and sixth modular connector elements being oriented relative to the first, second and third modular connector elements in such a way that the fourth, fifth and sixth hollow metal logs extend at an angle to the first, second and third hollow metal logs and the modular connector elements being formed with cutouts whereby:
the fifth modular connector element is locked between the first and second modular connector elements,
the first modular connector element is locked between the fourth and fifth modular connector elements,
the fourth modular connector element is locked between the first and third modular connector elements,
the third modular connector element is locked between the fourth and sixth modular connector elements, and said fourth, fifth, and sixth modular connector elements lock said fourth, fifth, and sixth hollow metal logs together.

17. A method of assembling a building superstructure comprising the steps of:
providing a plurality of modular click connector elements;
forming each of the modular click connector elements with a pair of engageable cutouts;
connecting each end of a plurality of hollow metal logs to a modular click connector element;
stacking the modular click connector elements with the attached logs to form at least two walls extending at an angle to each other and meeting at a corner formed by the modular click connector elements, the modular click connector elements for the logs of one wall alternating with the modular click connector elements for the logs of the other wall; and
click-connecting a modular click connector element connected to a log of one wall to a modular click connector element connected to the next lower log of the same wall while engaging the cutouts to trap between the two logs a modular click connector element connected to a log of the other wall.

18. The method of claim 17 comprising the step of making each modular click connector element indivisible.

* * * * *